(12) United States Patent
Bedichek et al.

(10) Patent No.: US 7,761,857 B1
(45) Date of Patent: Jul. 20, 2010

(54) METHOD FOR SWITCHING BETWEEN INTERPRETATION AND DYNAMIC TRANSLATION IN A PROCESSOR SYSTEM BASED UPON CODE SEQUENCE EXECUTION COUNTS

(76) Inventors: Robert Bedichek, 2951 South Ct., Palo Alto, CA (US) 94306; Linus Torvalds, 1050 Woodduck Ave., Santa Clara, CA (US) 95051; David Keppel, 6852 19th Ave. NE., Seattle, WA (US) 98115

( * ) Notice: Subject to any disclaimer, the term of this patent is extended or adjusted under 35 U.S.C. 154(b) by 0 days.

(21) Appl. No.: 09/417,332

(22) Filed: Oct. 13, 1999

(51) Int. Cl.
G06F 9/455 (2006.01)
(52) U.S. Cl. .................. 717/138; 717/139
(58) Field of Classification Search .......... 717/136–140
See application file for complete search history.

(56) References Cited

U.S. PATENT DOCUMENTS

| | | | |
|---|---|---|---|
| 4,434,459 A | 2/1984 | Holland et al. | |
| 4,794,522 A | 12/1988 | Simpson | |
| 5,167,023 A | 11/1992 | de Nicolas et al. | |
| 5,361,389 A | 11/1994 | Fitch | |
| 5,494,821 A | 2/1996 | Takahashi et al. | |
| 5,537,559 A | 7/1996 | Kane et al. | |
| 5,596,390 A | 1/1997 | Sawada | |
| 5,625,835 A | 4/1997 | Ebcioglu et al. | |
| 5,636,366 A * | 6/1997 | Robinson et al. | 717/163 |
| 5,668,969 A | 9/1997 | Fitch | |
| 5,692,169 A | 11/1997 | Kathail et al. | |
| 5,721,927 A | 2/1998 | Baraz et al. | |
| 5,724,590 A | 3/1998 | Goettelmann et al. | |
| 5,748,936 A | 5/1998 | Karp et al. | |
| 5,751,942 A | 5/1998 | Christensen et al. | |
| 5,751,982 A | 5/1998 | Morley | |
| 5,757,942 A | 5/1998 | Kamatani et al. | |
| 5,761,467 A | 6/1998 | Ando | |
| 5,784,585 A | 7/1998 | Denman | |
| 5,790,625 A | 8/1998 | Arimilli | |
| 5,790,825 A | 8/1998 | Traut | |
| 5,832,202 A | 11/1998 | Slavenburg et al. | |
| 5,832,205 A | 11/1998 | Kelly et al. | |
| 5,842,017 A | 11/1998 | Hookway et al. | |
| 5,867,681 A | 2/1999 | Worrell et al. | |

(Continued)

FOREIGN PATENT DOCUMENTS

EP    0908820 A2    4/1999

(Continued)

OTHER PUBLICATIONS

Bala et al.; "Transparent Dynamic Optimization: the Design and Implementation of Dynamo;" HP Laboratories Cambridge HPL-1999-78; Jun. 1999.

(Continued)

*Primary Examiner*—Richard Ellis

(57) ABSTRACT

A method for executing a target application on a host processor including the steps of translating each target instruction being to be executed into host instructions, storing the translated host instructions, executing the translated host instructions, responding to an exception during execution of a translated instruction by rolling back to a point in execution at which correct state of a target processor is known, and interpreting each target instruction in order from the point in execution at which correct state of a target processor is known.

26 Claims, 3 Drawing Sheets

U.S. PATENT DOCUMENTS

| | | | |
|---|---|---|---|
| 5,875,318 | A | 2/1999 | Langford |
| 5,915,117 | A | 6/1999 | Ross et al. |
| 5,925,123 | A | 7/1999 | Tremblay et al. |
| 5,948,112 | A | 9/1999 | Shimada et al. |
| 6,011,908 | A | 1/2000 | Wing et al. |
| 6,031,992 | A | 2/2000 | Cmelik et al. |
| 6,044,450 | A | 3/2000 | Tsushima et al. |
| 6,052,708 | A | 4/2000 | Flynn et al. |
| 6,091,897 | A * | 7/2000 | Yates et al. ............ 717/138 |
| 6,112,299 | A | 8/2000 | Ebcioglu et al. |
| 6,164,841 | A | 12/2000 | Mattson, Jr. et al. |
| 6,199,152 | B1 | 3/2001 | Kelly et al. |
| 6,202,143 | B1 | 3/2001 | Rim |
| 6,230,260 | B1 | 5/2001 | Luick |
| 6,308,318 | B2 * | 10/2001 | Krishnaswamy ............ 717/139 |
| 6,351,844 | B1 | 2/2002 | Bala |
| 6,356,615 | B1 | 3/2002 | Coon et al. |
| 6,363,336 | B1 | 3/2002 | Banning et al. |
| 6,408,325 | B1 | 6/2002 | Shaylor |
| 6,415,379 | B1 | 7/2002 | Keppel et al. |
| 6,463,582 | B1 * | 10/2002 | Lethin et al. ............ 717/158 |
| 6,594,821 | B1 | 7/2003 | Banning et al. |
| 6,615,300 | B1 | 9/2003 | Banning et al. |
| 6,658,551 | B1 | 12/2003 | Berenbaum et al. |
| 6,704,925 | B1 | 3/2004 | Bugnion |
| 6,714,904 | B1 | 3/2004 | Torvalds et al. |
| 6,738,892 | B1 | 5/2004 | Coon et al. |
| 6,845,353 | B1 | 1/2005 | Bedichek et al. |
| 6,871,274 | B2 | 3/2005 | Nunomura |
| 6,990,658 | B1 | 1/2006 | Torvalds et al. |
| 7,089,404 | B1 | 8/2006 | Rozas et al. |
| 7,096,460 | B1 | 8/2006 | Banning et al. |
| 7,107,580 | B2 | 9/2006 | Zemach et al. |
| 7,111,096 | B1 | 9/2006 | Banning et al. |
| 7,331,041 | B1 | 2/2008 | Torvalds et al. |
| 7,404,181 | B1 | 7/2008 | Banning et al. |
| 7,475,230 | B2 | 1/2009 | Chou et al. |
| 2002/0092002 | A1 * | 7/2002 | Babaian et al. ............ 717/137 |
| 2005/0060705 | A1 | 3/2005 | Katti et al. |
| 2007/0006189 | A1 | 1/2007 | Li et al. |

FOREIGN PATENT DOCUMENTS

| | | | |
|---|---|---|---|
| WO | 0148605 | A1 | 7/2001 |

OTHER PUBLICATIONS

Cifuentes, Cristina and Malhotra, Vishv, Binary Translation: Static, Dynamic, Retargetable?, International Conference on Software Mainteance, Nov. 4-8, 1996.

Holzle, Urs, Adaptive Optimization for SELF: Reconciling High Performance with Exploratory Programming, Dotorial Dissertation, Aug. 1994.

Ung et al.; "Dynamic Re-Engineering of Binary Code With Run-Time Feedbacks;" Department of Computer Science and Electrical Engineering, University of Queensland, QLD, Australia; 2000.

Ung et al.; "Machine-Adaptable Dynamic Binary Translation;" Proceedings of the ACM Sigplan Workshop on Dynamic and Adapative Compilation and Optimization, Jan. 2000 pp. 30-40.

Notice of Allowance; Mail Date Jul. 27, 2007; U.S. Appl. No. 10/406,022.

Non Final Office Action; Mail Date Mar. 29, 2006; U.S. Appl. No. 10/406,022.

Notice of Allowance; Mail Date Feb. 21, 2003; U.S. Appl. No. 09/539,987.

Examiner Interview Summary; Mail Date Apr. 14, 2003; U.S. Appl. No. 09/417,358.

Non Final Office Action; Mail Date Apr. 25, 2002; U.S. Appl. No. 09/417,358.

Non Final Office Action; Mail Date Dec. 20, 2000; U.S. Appl. No. 09/417,358.

Notice of Allowance; Mail Date Jun. 20, 2003; U.S. Appl. No. 09/417,358.

Non Final Office Action; Mail Date Mar. 3, 2006; U.S. Appl. No. 10/670,900.

Final Office Action; Mail Date Jan. 16, 2009; U.S. Appl. No. 12/002,983.

Non Final Office Action; Mail Date Aug. 5, 2008; U.S. Appl. No. 12/002,983.

Office Action; Mail Date Sep. 6, 2001; U.S. Appl. No. 09/417,358.

Notice of Allowance; Mail Date Mar. 29, 2006; U.S. Appl. No. 10/463,846.

Non Final Office Action; Mail Date Nov. 14, 2005; U.S. Appl. No. 10/463,846.

Final Office Action, Mail Date Jun. 20, 2005; U.S. Appl. No. 10/463,846.

Non Final Office Action, Mail Date Jan. 5, 2005; U.S. Appl. No. 10/463,846.

Notice of Allowance, Mail Date Mar. 17, 2008; U.S. Appl. No. 11/507,779.

Non Final Office Action, Mail Date Oct. 9, 2007; U.S. Appl. No. 11/507,779.

Non Final Office Action, Mail Date Jun. 8, 2007; U.S. Appl. No. 11/507,779.

Non Final Office Action, Mail Date Apr. 27, 2009; U.S. Appl. No. 12/177,836.

Non Final Office Action, Mail Date Mar. 3, 2006; U.S. Appl. No. 10/670,900.

Non Final Office Action, Mail Date Apr. 13, 2009; U.S. Appl. No. 10/672,790.

Final Office Action, Mail Date Apr. 11, 2008; U.S. Appl. No. 10/672,790.

Non Final Office Action, Mail Date Sep. 24, 2007; U.S. Appl. No. 10/672,790.

Final Office Action, Mail Date Dec. 20, 2006; U.S. Appl. No. 10/672,790.

Non Final Office Action, Mail Date Jun. 26, 2006; U.S. Appl. No. 10/672,790.

Non-Final Office Action Dated May 19, 2009; U.S. Appl. No. 12/002,983.

Final Office Action Dated Dec. 2, 2009; U.S. Appl. No. 12/002,983.

Final Office Action Dated Oct. 22, 2009; U.S. Appl. No. 12/177,836.

Non-Final Office Action Dated Sep. 28, 2009; U.S. Appl. No. 11/169,404.

Hwu et al. "Checkpoint repair for out-of-order execution machines", Proceedings of the 14th annual international symposium on Computer architecture, 1987, pp. 18-26.

Non-Final Office Action Dated Feb. 23, 2010; U.S. Appl. No. 12/177,836.

* cited by examiner

METHOD FOR SWITCHING BETWEEN INTERPRETATION AND DYNAMIC TRANSLATION IN A PROCESSOR SYSTEM BASED UPON CODE SEQUENCE EXECUTION COUNTS

BACKGROUND OF THE INVENTION

1. Field of the Invention

This invention relates to computer systems and, more particularly, to methods and apparatus for improving the operation of a new microprocessor adapted to execute programs designed for a processor having an instruction set different than the instruction set of the new microprocessor.

2. History of the Prior Art

Recently, a new microprocessor was developed which combines a simple but fast host processor (called "morph host") and software (called "code morphing software") to execute application programs designed for a processor (the target processor) different than the morph host processor. The morph host processor executes the code morphing software to translate the application programs into morph host processor instructions which accomplish the purpose of the original target software. As the target instructions are translated, the new host instructions are both executed and stored in a translation buffer where they may be accessed without further translation. Although the initial translation and execution of a program is slow, once translated, many of the steps normally required to execute a program in hardware are eliminated. The new microprocessor has demonstrated that a simple fast processor designed to expend little power is able to execute translated "target" instructions at a rate equivalent to that of the "target" processor for which the programs were designed.

In order to be able to execute programs designed for other processors at a rapid rate, the morph host processor includes a number of hardware enhancements. One of these enhancements is a gated store buffer which resides between the host processor and the translation buffer. A second enhancement is a set of host registers which store state of the target machine at the beginning of any sequence of target instructions being translated. Generated as sequences of morph host instructions are executed and memory stores are placed in the gated store buffer. If the morph host instructions execute without raising an exception, the target state at the beginning of the sequence of instructions is updated to the target state at the point at which the sequence completed and the memory stores are committed to memory.

If an exception occurs during the execution of the sequence of host instructions which have been translated, processing stops; and the entire operation may be returned or rolled back to the beginning of the sequence of target instructions at which known state of the target machine exists in the set of host registers. This allows rapid and accurate handling of exceptions.

The combination of the code morphing software and the enhanced host processing hardware dynamically translates sequences of target instructions into sequences of instructions of a host instruction set which may be reused without being translated again. Moreover, the new processor also optimizes the translated instructions during and after the initial translation. For example, sequences of host instructions translated from the target program may be reordered, rescheduled, and optimized in other manners to provide code which executes rapidly. Optimized sequences of translated instructions may often be linked with other translated and optimized sequences of instructions so that the process may further optimized as the instructions continue to be executed. The new processor is described in detail in U.S. Pat. No. 5,832,205, Improved Memory Control System For Microprocessor, issued Nov. 3, 1998, to E. Kelly et al., and assigned to the assignee of the present invention.

One difficulty which has limited the speed of operation of the improved microprocessor has been that many instructions being translated and stored for reuse are reused only infrequently if at all. Because the translation process is time consuming, the average time for execution of all translated instructions is lowered by translating these little used instructions. This is especially a problem where the translated sequences have been linked to other translated sequences and significantly optimized.

In addition to the time taken to translate and optimize sequences of instructions, each translation requires storage. If each translated sequence continues to be stored in the translation buffer, an inordinate amount of storage is ultimately required.

It is desirable to increase the speed of execution of instructions by the new microprocessor while reducing the storage required for translated instructions.

SUMMARY OF THE INVENTION

It is, therefore, an object of the present invention to increase the speed of execution of instructions by the new microprocessor while reducing the storage required for translated instructions.

This and other objects of the present invention are realized by a method for executing a target application on a host processor including the steps of translating each target instruction being to be executed into host instructions, storing the translated host instructions, executing the translated host instructions, responding to an exception during execution of a translated instruction by rolling back to a point in execution at which correct state of a target processor is known, and interpreting each target instruction in order from the point in execution at which correct state of a target processor is known.

These and other objects and features of the invention will be better understood by reference to the detailed description which follows taken together with the drawings in which like elements are referred to by like designations throughout the several views.

DETAILED DESCRIPTION

Figure 1:
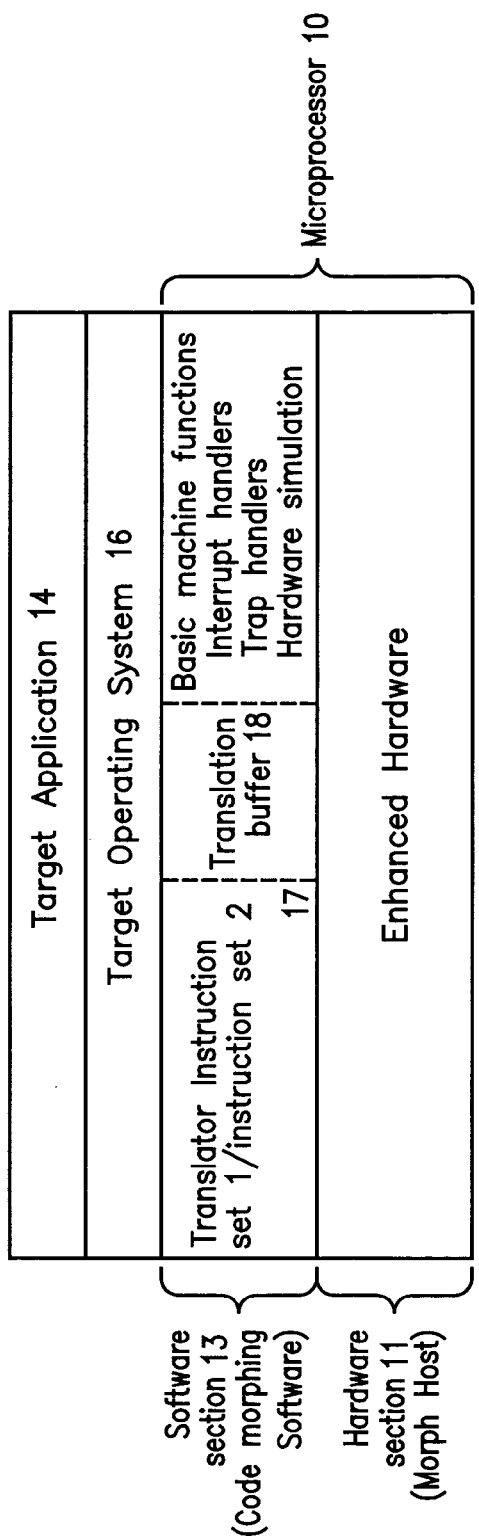
FIG. 1 is a logical diagram of a microprocessor designed in accordance with the present invention running an application designed for a different microprocessor.

The new microprocessor 10 (shown in FIG. 1) combines an enhanced hardware processing portion 11 (sometimes referred to as a "morph host" in this specification) which is much simpler than typical state of the art microprocessors and an emulating software portion 13 (referred to as "code morphing software" in this specification). The two portions function together as a microprocessor with advanced capabilities.

The morph host 11 includes hardware enhancements to assist in providing state of a target computer immediately when an exception or error occurs, while the code morphing software 13 includes software which translates the instructions of a target program into morph host instructions, optimizes the translated instructions, and responds to exceptions and errors by providing correct target state at a point at which the translation is known to be correct so that correct retranslations can occur from that point.

FIG. 1 shows morph host hardware designed in accordance with the present invention executing a target application program 14 which is designed to run on a CISC processor such as a X86 processor. The target application and the target operating are executed on the host hardware with the assistance of the code morphing software 13.

The code morphing software 13 of the microprocessor 10 includes a translator portion 17 which decodes the instructions of the target application, converts those target instructions on the fly (dynamically) to host instructions capable of execution by the morph host, optimizes the operations required by the target instructions for execution by the morph host, reorders and schedules the primitive instructions into host instructions (a translation) for the morph host, and executes the host instructions.

In order to accelerate the operation of the new microprocessor, the code morphing software includes a translation buffer 18 as is illustrated in FIG. 1. The translation buffer 18 is used to store the host instructions which embody each completed translation of the target instructions once the individual target instructions have been translated by the morph host 11. The translated host instructions may thereafter be recalled for execution whenever the operations required by the target instruction or instructions are required.

Figure 3:
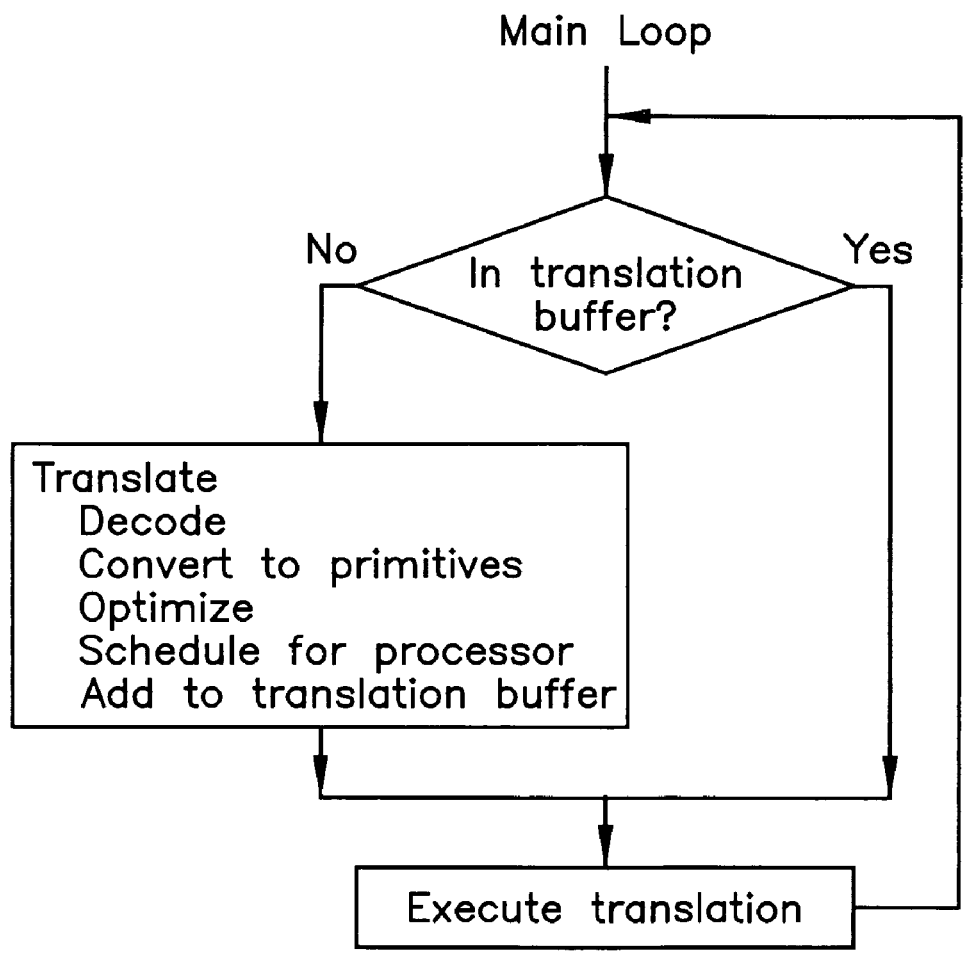
FIG. 3 illustrates the operation of a main translation loop of the microprocessor of FIG. 1.

FIG. 3 illustrates the operation of a main (translation) loop of the code morphing software. In a typical operation, the code morphing software of the microprocessor, when furnished the address of a target instruction, first determines whether the target instruction at the target address has been translated. If the target instruction has not been translated, it and subsequent target instructions are fetched, decoded, translated, and then (possibly) optimized, reordered, and rescheduled into a new host translation, and stored in the translation buffer by the translator. Control is then transferred to cause execution of the translation by the enhanced morph host hardware to resume.

When the particular target instruction sequence is next encountered in running the application, the host translation will be found in the translation buffer and immediately executed without the necessity of translating, optimizing, reordering, or rescheduling. Since the translation for a target instruction will be found by the morph host in the translation buffer, the myriad of steps required by the typical target processor each time it executes any instruction are eliminated. This drastically reduces the work required for executing the instructions and increases the speed of the new microprocessor.

The morph host includes hardware enhancements especially adapted to allow the acceleration techniques provided by the code morphing software to be utilized efficiently over a much broader range of instructions. Many of these hardware enhancements are used to overcome the inability of prior art techniques to handle with decent performance exceptions generated during the execution of a target program. Exceptions require that the correct target state be available at the time the exception occurs for proper execution of the exception and the instructions which follow.

Figure 2:
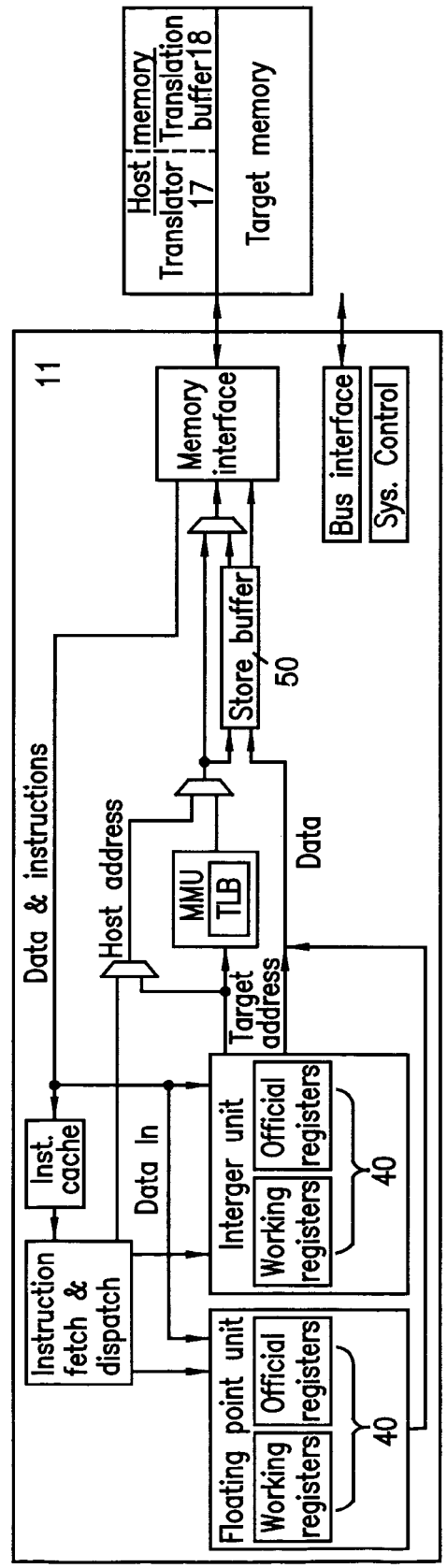
FIG. 2 is a block diagram illustrating the microprocessor shown in FIG. 1.

In order to overcome these limitations, the enhanced morph host 11 of the new processor (shown in block form in FIG. 2) incorporates a gated store buffer 50 and a large plurality of additional processor registers 40. The gated store buffer 50 stores working memory state changes on an "uncommitted" side of a hardware "gate" and official memory state changes on a "committed" side of the hardware gate where these committed stores are able to "drain" to main memory. An operation called "commit" transfers stores from the uncommitted side of the gate to the committed side of the gate once execution of the translated code occurs without an exception. Some of the additional registers (called target registers) are used to hold the official state of the target processor at a last known correct condition; others are used as working registers. The target registers are connected to their working register equivalents through a dedicated interface that allows a commit operation to quickly transfer the content of all working registers to official target registers and allows an operation called "rollback" to quickly transfer the content of all official target registers back to their working register equivalents. The additional official registers and the gated store buffer allow the state of memory and the state of the target registers to be updated together once one or a group of target instructions have been translated and run without error.

If the primitive host instructions making up a translation of a series of target instructions are run by the host processor without generating exceptions, then the working memory stores and working register state generated by those instructions are transferred to official memory and to the official target registers. However, if an exception occurs when processing the translated host instructions at a point which is not on the boundary of a sequence of target instructions being translated, the original state in the target registers at the last update (or commit) may be recalled to the working registers and uncommitted memory stores in the gated store buffer may be discarded. Then, the target instructions causing the target exception may be retranslated one at a time as they would be executed by a target microprocessor and the translated code executed in serial sequence. As each target instruction is correctly executed without error, the state of the target registers may be updated; and the data in the store buffer gated to memory. Then, when the target exception occurs again in running the host instructions, the correct state of the target computer is held by the target registers of the morph host and memory; and the exception may be correctly handled without delay.

In addition to simply translating the instructions, optimizing, reordering, rescheduling, storing, and executing each translation so that it may be rerun whenever that set of instructions needs to be executed, the translator also links the different translations to eliminate in almost all cases a return to the main loop of the translation process. Eventually, the main loop references in the branch instructions of host instructions are almost completely eliminated. When this condition is reached, the time required to fetch target instructions, decode target instructions, fetch the primitive instructions which make up the target instructions, optimize those primitive operations, reorder the primitive operations, and reschedule those primitive operations before running any host instruction is eliminated. Moreover, in contrast to all prior art microprocessors, long sequences of translated instructions exist which may be further optimized to increase the speed of execution.

A problem which has occurred with the new processor relates to those instructions of the target application which are seldom executed. For example, instructions required to initiate operation of a particular application are often executed only when the application is first called; and instructions required to terminate operation of an application are often executed only when the program is actually terminated. However, the new processor typically treats all instructions in the same manner. It decodes a target instruction, fetches the primitive host instructions which carry out the function for which the target instruction is designed, proceeds through an extensive process of optimizing, and then stores the translated and optimized instruction in the translation cache. As the operation of the new processor proceeds, the translated instructions are linked to one another and further optimized; and the translation of the linked instructions is stored in the translation buffer. Ultimately, large blocks of translated instructions are stored as super-blocks of host instructions. When an exception occurs during execution of a particular translated instruction or linked set of instructions, the new processor goes through the process of rolling back to the last correct state of the target processor and then provides a single step translation of the target instructions from the point of the last correct state to the point at which the exception again occurs. In prior embodiments of the new processor, this translation is also stored in the translation buffer.

Although this process creates code which allows rapid execution, the process has a number of effects which limit the overall speed attainable and may cause other undesirable effects. First, if a sequence of instructions is to be run but once or a few times, the time required to accomplish optimizing may be significantly greater than the time needed to execute a step-by-step translation of the initial target instructions. This is especially true where the optimization accomplished includes linking translated sequences to one another. This overhead of the optimization tends to lower the average speed of the new processor. Second, the process requires a substantial amount of storage capacity for translated instructions. Many times a number of different translations exist for the same set of target instructions because the sequences were entered from different branches. Once stored, the translated instructions occupy this storage until removed for some affirmative reason.

To overcome these problems, the new processor utilizes as a part of the code morphing software, an interpreter which accomplishes step-by-step execution of target instructions. Such an interpreter could be stored as a part of host memory illustrated in FIG. 2. Although there are many possible embodiments, an interpreter is essentially a program that fetches a target instruction, decodes the instruction, provides a host process to accomplish the purpose of the target instruction, and executes the host process. When it finishes interpreting one target instruction and executing the host process to carry out the result commanded by the target instruction, the interpreter precedes to the next target instruction. This process essentially single steps through the target instructions. As each target instruction is interpreted, the state of the target processor is brought up to date. The interpretation process, in contrast to the translation process, does not store host instructions in the translation buffer for future execution. The interpreter continues the process for the remainder of the sequence of target instructions.

An interpreter offers a number of advantages that are useful in certain situations. Because an interpreter causes the execution of host processes intended to carry out the purpose of each target instruction, it does not involve the complicated steps necessary to translate a sequence of target instructions. Since interpreted host processes typically are not stored in the translation cache, linking and the further optimizations available after linking need not be carried out.

Not only does the use of an interpreter eliminate the need to optimize instructions which are not used during execution of the application and thereby increase the speed of operation, it also reduces the need for storage in the translation buffer and eliminates the need to discard many translated instructions. Interpretation may in fact be quite rapid as contrasted to translation and optimization for instructions which are little used during the execution of an application. Thus, a sequence of instructions which runs only once might be better and more rapidly handled by simply interpreting and never translating the sequence. Thus, for such instructions it may be desirable to utilize the interpreter instead of the translator software.

Figure 4:
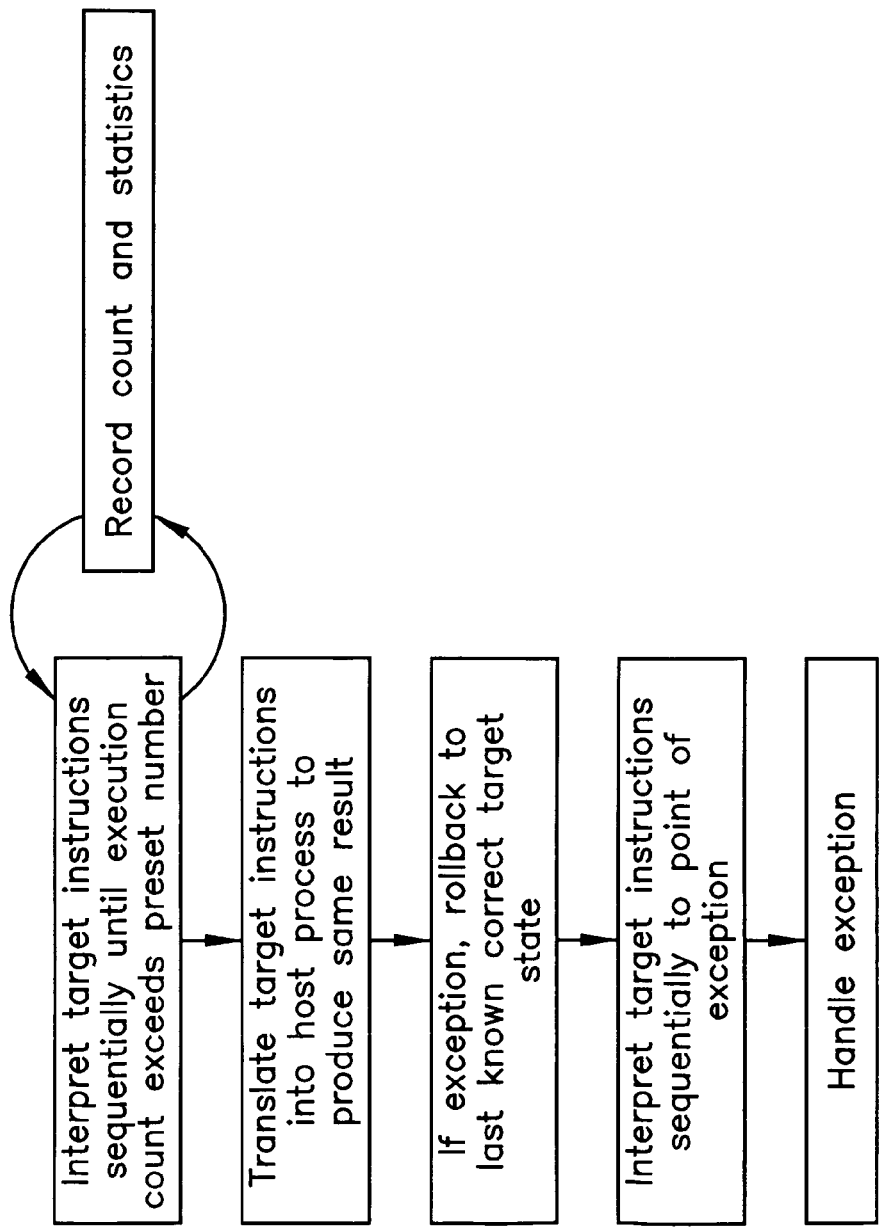
FIG. 4 is a flow chart illustrating a method practiced by a microprocessor designed in accordance with the present invention.

In order to make use of these advantages, the new processor includes apparatus and a method illustrated in FIG. 4 for running the interpreter whenever a sequence of target instructions is first encountered. The interpreter software may be associated with a counter which keeps track of the number of times sequences of instructions are executed. The interpreter may be run each time the sequence is encountered until it has been executed some number of times without generating an exception. When the particular sequence of target instructions has been interpreted some selected number of times, the code morphing software switches the process from the interpreter to the translation, optimization, and storage process. When this occurs, the sequence will have been executed a sufficient number of times that it is probable that execution of the sequence will reoccur; and a stored optimized translation will provide significantly faster execution of the application as a whole from that point on.

When the code morphing software switches to the translation process, the translation is optimized and stored in the translation cache. Thereafter, that translation may be further optimized and linked to other translations so that the very high speeds of execution realized from such processes may be obtained.

An especially useful embodiment records data relating to the number of times a target instruction is executed by the interpreter only at points at which branches occur in the instructions. The interpreter single steps through the various target instructions until a branch occurs. When a branch instruction occurs, statistics regarding that particular branch instruction (the instruction with the particular memory address) are recorded. Since all of the target instructions from the beginning of a sequence until the branch will simply be executed in sequential order, no record need be kept until the point of the branch.

Moreover, if the interpreter is utilized to collect statistics in addition to the number of times a particular target instruction has been executed, additional significant advantages may be obtained. For example, if a target instruction includes a branch, the address of the instruction to which it branches may be recorded along with the number of times the branch has been executed. Then, when a number of sequential target instructions are executed by the interpreter, a history of branching and branch addresses will have been established. From this, the likelihood of a particular branch operation taking place may be determined. These statistics may be utilized to guide super-block formation. By utilizing these statistics, a particular sequence of instructions may be speculatively considered to be a super-block after being executed a significant number of times. After being interpreted for the selected number of times, the sequence may be translated, optimized, linked through the various branches without the necessity to go through a separate linking operation, and stored as such in the translation cache. If the speculation turns out to be true, then significant time is saved in processing the instructions. If not, the operation causes an exception which returns the code morphing software to the interpreter.

It has been discovered that, in addition to handling the generation of host instructions some initial number of times when a sequence of target instructions is first encountered, the interpreter may also be used advantageously when a translated sequence of instructions encounters an exception. In accordance with the present invention, whenever the new processor encounters a target exception while executing any sequence of host instructions translated from a sequence of target instructions, the code morphing software causes a rollback to occur to the last known correct state of the target processor. Then, the interpreter portion of the code morphing software is utilized rather than the translator portion to execute the sequence of instructions. The interpreter proceeds to interpret the target instructions to the point at which the exception occurred.

The interpreter carries out each individual one of the target instructions in the sequence on a step by step basis. The interpreter fetches a target instruction, decodes the instruction, provides a host process to accomplish the purpose of the target instruction, and executes the host process. When it finishes interpreting one target instruction and executing the host process to carry out the result commanded by the target instruction, the interpreter proceeds to the next target instruction. As each target instruction is interpreted and executed, the state of the target processor is brought up to date. The interpreter continues this process for the remainder of the sequence of target instructions until the exception again occurs. Since target state is brought up to date as each target instruction is interpreted, the state is correct at that point to correctly handle the exception.

The interpreter handles exceptions as well as the translator but offers many additional benefits. Because the interpretation process is simple, the process of determining the point of occurrence of a target exception is significantly faster than the determination of such a point when carried out by the translation process which goes through the above-described translation and optimization process and then stores host instructions in the translation buffer.

The use of the interpreter to handle the process of determining the state of the target processor at the point of a target exception eliminates the need to translate and store the host instructions used to determine that state.

By utilizing the combination of the interpreter and the optimizing translator which functions as a dynamic compiler of sequences of translated instructions to handle exceptions generated during execution of translated sequences of instructions, the code morphing software significantly enhances the operations of the new processor. The use of the interpreter to handle exceptions has the same useful effects as using a translator for this purpose while speeding operations and reducing storage requirements.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for executing a target application on a host processor comprising:
    interpreting each of a sequence of target instructions to produce a sequence of host instructions and executing the sequence of host instructions;
    translating into host instructions each of a sequence of target instructions to produce translated host instructions, wherein the translating is performed when the number of times a sequence of target instructions is executed exceeds a preset count;
    storing the translated host instructions wherein a plurality of additional registers are used during execution for holding the official state of a target processor;
    responding to an exception during execution of a stored translated host instruction by rolling back to a previous point in execution at which correct state of a target processor is known; and
    interpreting each target instruction in order from the point in execution at which a correct state of a target processor is known.

2. The method as claimed in claim 1 which further comprises:
    collecting statistics regarding the execution of sequences of instructions which are interpreted.

3. The method as claimed in claim 1, further comprising:
    speculatively translating target instructions into host instructions based on a likelihood of a branch being taken.

4. The method as claimed in claim 1, further comprising:
    collecting statistics regarding the execution of sequences of target instructions which are executed.

5. The method as claimed in claim 4, wherein the statistics include the number of times a branch to target instructions have executed.

6. The method as claimed in claim 5, further comprising:
    speculatively translating target instructions into host instructions based on a likelihood of a branch being taken.

7. The method as claimed in claim 1, further comprising:
    collecting statistics regarding the execution of sequences of target operations which are executed.

8. The method as claimed in claim 7, wherein the statistics comprise the number of times a branch of target operations have executed.

9. The method as claimed in claim 8, further comprising:
    speculatively translating target operations into host operations based on a likelihood of a branch being taken.

10. A method for executing a target application on a host processor comprising the:
    interpreting sequentially each of a sequence of target instructions to produce interpreted host instructions and executing the interpreted host instructions representing each target instruction of the target application;
    performing a translation process when the number of times a host instruction is executed exceeds a preset count to produce translated host instructions wherein a plurality of additional registers are used during execution for holding the official state of a target processor;
    responding to an exception during execution of the translated host instructions representing a target instruction by returning to a previous point in execution of the target application at which a correct state of a target processor is known; and
    thereafter executing host instructions by interpretation of the target instruction until the point of the exception.

11. The method as claimed in claim 10 which further comprises collecting statistics regarding the execution of sequences of target instructions which are executed.

12. The method as claimed in claim 11 in which the statistics include the number of times the sequence of target instructions have executed.

13. The method as claimed in claim 11 in which the statistics include an address of an instruction to which a target instruction including a branch operation branches.

14. The method as claimed in claim 11 in which the statistics include a likelihood of a branch being taken.

15. A computer system comprising:
a bus;
a memory unit coupled with the bus, wherein said memory unit is operable to store computer-readable instructions for executing a target application designed for execution on a target processor on a host processor having an instruction set different than that of the target processor; and
a processor coupled with the bus, wherein when the computer readable instructions comprise:
instructions to interpret a sequence of target instructions to produce a sequence of host instructions and executing each of the sequences of host instructions;
instructions to translate sequences of target instructions to produce translated sequences of instructions when the number of times a sequence of target instructions is executed exceeds a preset count;
instructions to store each translated sequence of instructions wherein a plurality of additional registers are used during execution for holding the official state of the target processor,
instructions to respond to an exception during execution of a stored translated instruction by rolling back to a previous point in execution at which correct state of a target processor is known, and
instructions to interpret each target instruction in order from a point in execution at which a correct state of a target processor is known through the target instruction causing the exception.

16. The system as claimed in claim 15 in which the instructions to interpret comprise an interpreter software executing on the host processor, and
the instructions to translate comprise dynamic translation software executing on the host processor.

17. The computer-readable medium as claimed in claim 15, further comprising:
instructions to collect statistics including the number of times a branch of target instructions have executed.

18. The computer-readable medium of claim 17, further comprising:
instructions to speculatively translating target instructions into host instructions based on a likelihood of a branch being taken.

19. A method for executing a target application on a host processor comprising:
interpreting each of a sequence of target instructions to produce host instructions and executing the host instructions;
translating into translated host instructions each of a sequence of target instructions, wherein the translating is performed when the number of times a sequence of target instructions is executed exceeds a preset count;
storing the translated host instructions wherein a plurality of additional registers are used during execution for holding the official state of a target processor and wherein a buffer stores working memory state changes and official memory state changes;
responding to an exception during execution of a stored translated host instruction by rolling back to a previous point in execution at which a correct state of a target processor is known; and
interpreting each target instruction in order from the point in execution at which the correct state of a target processor is known.

20. A method for executing a target application on a host microprocessor, the method comprising:
interpreting each of a sequence of target operations to produce host operations and executing the host operations;
translating into host operations each of a sequence of target operations to produce translated host operations, wherein said translating is performed when the number of times a sequence of target operations is executed exceeds a predetermined count;
storing the translated host operations, wherein a plurality of additional registers are used during execution for holding the official state of a target microprocessor;
responding to an exception during execution of a stored translated host operation by rolling back to a previous time in execution at which a correct state of a target microprocessor is known; and
interpreting each target operation in order from the time in execution at which the correct state of a target microprocessor is known.

21. The method as claimed in claim 20, further comprising:
collecting statistics regarding the execution of sequences of operations which are interpreted.

22. The method as claimed in claim 20, further comprising:
speculatively translating target operations into host instructions based on a likelihood of a branch being taken.

23. A tangible computer-readable medium having instructions stored thereon, the instructions comprising:
instructions to interpret a sequence of target instructions to produce host instructions and execute each of the host instructions;
instructions to translate sequences of target instructions to produce sequences of host instructions when the number of times a sequence of target instructions is executed exceeds a preset count;
instructions to store each translated sequence of instructions, wherein a plurality of additional registers are used during execution for holding the official state of the target processor;
instructions to respond to an exception during execution of a stored translated instruction by rolling back to a previous point in execution at which a correct state of a target processor is known; and
instructions to interpret each target instruction in order from a point in execution at which the correct state of a target processor is known through the target instruction causing the exception.

24. The computer-readable medium as claimed in claim 23, wherein said instructions to interpret comprise an interpreter software executing on a host processor, and wherein said instructions to translate comprise dynamic translation software executing on the host processor.

25. The computer-readable medium as claimed in claim 23, wherein the instructions further comprise:
instructions to collect statistics including the number of times a branch of target instructions have executed.

26. The computer-readable medium as claimed in claim 25, wherein the instructions further comprise:
instructions to speculatively translate target instructions into host instructions based on a likelihood of a branch being taken.

* * * * *